(12) United States Patent
Serrano Garcia et al.

(10) Patent No.: US 11,223,566 B2
(45) Date of Patent: Jan. 11, 2022

(54) CELLULAR NETWORK MANAGEMENT BASED ON AUTOMATIC SOCIAL-DATA ACQUISITION

(71) Applicant: Telefonaktiebolaget LM Ericsson (publ), Stockholm (SE)

(72) Inventors: Inmaculada Serrano Garcia, Campanillas (ES); Raquel Barco Moreno, Malaga (ES); Sergio Fortes Rodriguez, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 16/609,291

(22) PCT Filed: May 1, 2017

(86) PCT No.: PCT/EP2017/060312
§ 371 (c)(1),
(2) Date: Oct. 29, 2019

(87) PCT Pub. No.: WO2018/202272
PCT Pub. Date: Nov. 8, 2018

(65) Prior Publication Data
US 2020/0186473 A1    Jun. 11, 2020

(51) Int. Cl.
*H04L 12/801* (2013.01)
*H04W 28/02* (2009.01)
*H04W 28/08* (2009.01)

(52) U.S. Cl.
CPC .......... *H04L 47/127* (2013.01); *H04L 47/14* (2013.01); *H04W 28/0289* (2013.01); *H04W 28/08* (2013.01)

(58) Field of Classification Search
CPC .. H04L 47/127; H04L 47/14; H04W 28/0289; H04W 28/08; H04W 24/02; H04W 28/18; G06Q 50/01
See application file for complete search history.

(56) References Cited

U.S. PATENT DOCUMENTS 8,760,298 B2    6/2014  Cavanaugh
8,972,498 B2 *  3/2015  Zheng ................. G06Q 50/01
                                                    709/204

(Continued)

OTHER PUBLICATIONS

Hayes, Sean, et al., "EMULSIoN: Environment Mitigation on mULtimedia Streaming Networks", Aug. 24-28, 2015, pp. 1498-1503.

(Continued)

*Primary Examiner* — Huy D Vu
*Assistant Examiner* — Robert Ma
(74) *Attorney, Agent, or Firm* — Murphy, Bilak & Homiller, PLLC

(57) ABSTRACT

A method for predicting an increase in amount of traffic in a particular cell of a telecommunication network, wherein said telecommunication network comprises a plurality of access nodes, wherein each of said access nodes is arranged to serve a cell in said telecommunication network, wherein each cell covers a predefined coverage area, said method comprising the steps of receiving event information from at least one source which is external to said telecommunication network, wherein said event information comprises geographic data and temporal data of events that are to take place, associating said events with at least one particular access node of said plurality of access nodes based on said geographic data of each of said events and based on said predefined coverage areas of said cells and predicting an increase in amount of traffic in a cell of said telecommuni- (Continued)

cation network based on said associated events with at least one particular access node and their corresponding temporal data.

16 Claims, 7 Drawing Sheets

(56) References Cited

U.S. PATENT DOCUMENTS

| | | |
|---|---|---|
| 2016/0021578 A1* | 1/2016 | Bostick .............. H04W 28/18 370/332 |
| 2016/0028471 A1 | 1/2016 | Boss et al. |
| 2017/0019291 A1 | 1/2017 | Tapia et al. |

OTHER PUBLICATIONS

Klessig, Henrik, et al., "Twitter as a Source for Spatial Traffic Information in Big Data-Enabled Self-Organizing Networks", IEEE, Mar. 19-22, 2017, pp. 1-5.

Szilágyi, Péter, et al., "An Automatic Detection and Diagnosis Framework for Mobile Communication Systems", IEEE Transactions on Network and Service Management, vol. 9, No. 2,, Jun. 2012, pp. 184-197.

Unknown, Author, "Ericsson RAN Analyzer Network Impact Report", Release 14.3, Jul. 31, 2014, pp. 1-31.

\* cited by examiner

CELLULAR NETWORK MANAGEMENT BASED ON AUTOMATIC SOCIAL-DATA ACQUISITION

TECHNICAL FIELD

The disclosure generally relates to the field of Telecommunication networks and more particularly to Self-Organizing Networks. The disclosure particularly relates to a method of predicting an increase in amount of traffic in a particular cell of a telecommunication network.

BACKGROUND

Mobile communication has become an inseparable part of our day to day life. We find ourselves depending to an increasing extent on mobile phones and its communication networks. As mobile phones and the technology continues to make our lives easier, the complexity of cellular networks is increasing. Accordingly, the cost of operation, administration and management increases.

In this context, Self-Organizing Networks, SON, are gaining importance in that they provide an option whereby networks are able to adapt automatically to changes in requirement. An SON is an automation technology designed to make the planning, configuration, management, optimization and healing of mobile radio networks simpler and faster. Newly added access nodes should be self-configured in line with a plug and play paradigm, while all operational access nodes will regularly self-optimize parameters and algorithmic behaviour in response to observed network performance and radio conditions. Furthermore, self-healing mechanisms can be triggered to temporarily compensate for detected equipment outage, while awaiting a more permanent solution.

Primarily, the functions of an SON can be classified in to three aspects.

A first aspect is related to self-configuration. When a new access node is introduced into the network and powered ON, it gets recognized and registered by the network. This is often an automatic process, hence the self-configuration. The benefit hereof is that any neighbouring access nodes may then automatically adjust their technical parameters, such as emission power, antenna tilt etc., in order to provide the required coverage and capacity and, in the same time, avoid interference.

A second aspect is related to self-optimization. Every access node may comprise hundreds of configuration parameters that control various aspects of their corresponding cells. Each of these can be altered to change network behaviour, based on observations of both the access node itself and measurements at the mobile station or handset. One of the first SON features establishes neighbour relations automatically while other optimize random access parameters or mobility robustness in terms of handover oscillations A third aspect is related to self-healing. When some nodes in the network become inoperative, self-healing mechanisms aim at reducing the impacts from the failure, for example by adjusting parameters and algorithms in adjacent cells so that other nodes can support the users that were supported by the failing node. In legacy networks, the failing access nodes are at times hard to identify and a significant amount of time and resources is required to fix it. This function of SON permits to spot such a failing access node immediately in order to take further measures, and ensure no or insignificant degradation of service for the users.

For most of the present techniques, inputs for self-organizing come from the network itself. This may be obtained by monitoring the network, counters, alarms or other Key Performance Indicators, KPI. However, in cellular networks, human crowds/events can cause an essential impact in network performance. For example, they amount for a predominant part of network failures and performance degradations.

One of the challenges of present telecommunication networks is to predict an increase in amount of traffic in a cell, or a plurality of cells, which prediction can then be used for optimization of the telecommunication network.

SUMMARY

It is an object to provide for a method of predicting an increase in amount of traffic in a particular cell of a telecommunication network.

It is another object to provide for a node in a telecommunication network arranged for predicting an increase in amount of traffic in a particular cell of a telecommunication network.

In a first aspect of the disclosure, there is provided a method for predicting an increase in amount of traffic in a particular cell of a telecommunication network, wherein said telecommunication network comprises a plurality of access nodes, wherein each of said access nodes is arranged to serve a cell in said telecommunication network, wherein each cell covers a predefined coverage area.

The method comprises the steps of receiving event information from at least one source which is external to said telecommunication network, wherein said event information comprises geographic data and temporal data of events that are to take place, associating said events with at least one particular access node of said plurality of access nodes based on said geographic data of each of said events and based on said predefined coverage areas of said cells, predicting an increase in amount of traffic in a cell of said telecommunication network based on said associated events with at least one particular access node and their corresponding temporal data.

The method is at least based on the insight that a telecommunication network, for example a self-organizing network, SONs, is able to perform more efficient in case an increase in amount of traffic in a cell is predicted.

Such a prediction can, for example, be used for adjusting parameters, such as emission power, antenna tilt, etc., by obtaining information about social events from external sources. Information about events such as popularity and venue of the event is used to predict the number of people attending said event. This information may then be used to alter the parameters of particular cell or cells within a telecommunication network such that the network is able to function effectively while the event occurs.

In a first step, event information is received from external sources. The event information comprises geographical data and temporal data.

The invent information may be requested or acquired from the external sources. That is, the system may be arranged to take the initiative to request the information from the external sources.

The geographical data can be, for example, the name of a venue where the event is to take place. Additionally, the location could be specified by providing an address in string type such as street, city, region, country, postal code etc. Alternatively, geographical data could be in the form of a latitude and longitude by which the location may be identified on a map. Alternatively, the geographical data could be merely a region such as a town or city or a municipality or a state, covering a larger geographical extent as might be in the case of an event being organised in several venues in a city all at once or a parade.

The temporal data implies the time related data regarding the event. Such information often includes, a date and time when said event is to take place. Alternatively, the date could be provided as a range of dates and similarly the time could be provided as a range of times when said event is to take place.

It is noted that the term event may be used to imply any social gathering of human beings. Such an event could be the inauguration of a building, an exhibition, a show in a museum, a concert, a sporting event, a religious gathering, protests or any other possible scenario which is likely to attract people. Such events may be planned well in advance or can happen simultaneously owing to a particular sequence of events.

In a second step, the events are associated with a plurality of access nodes within a telecommunication network. These nodes can be any of a base station, an evolved node B or anything alike. In a telecommunication network, access nodes are assigned to cover or handle the communications originating or ending within a particular geographical area. Thus it is often expressed that a particular node is associated with a particular geographical area, i.e. a coverage area of a cell. Multiple nodes that fall within a certain predefined proximity tolerance of the event venue could be associated with one particular event.

In a third step, an increase in the amount of traffic may be predicted for the associated access nodes during the defined time period of the said social event. This increase could be, for example, used to allocate increased bandwidth to the particular nodes. Alternatively, the access nodes could transmit signals at a higher transmit power. Another option could be to adjust the orientation of a particular cell, or to use beamforming techniques, such that it covers a different, for example smaller, geographical area.

In an example of the disclosure, said method of predicting an increase in amount of network traffic comprises a further step of requesting said event information from said external source. This step usually occurs before the step of receiving event information from external sources. It is based on the insight that it would be advantageous to receive said event information when a node or the telecommunication network itself or a corresponding cloud service is actually receptive for said information.

For example, requesting event information could comprise specifying a particular geographical region and a particular time frame. Only event information falling within such limits are then received. The advantage is that there are only a fewer number of data rows available for consequent steps thereby reducing the amount of processing power required at further stages.

The geographical area could be defined by means of a minimum and maximum longitude and a minimum and maximum latitude. This, in effect, defines a region on a map, for example a rectangular region. Alternatively, the region could be defined by specifying one set of coordinates, for example latitude and longitude, together with a distance defining a circular region on a map. In yet another alternative, the geographical area is indicated with particular cell identification, like cell numbers. As such, the geographical area refers to the actual cells of the telecommunication network.

The time parameters could be defined using any year range, month range, date range, time range. The person skilled in the art realises that a combination of such ranges is possible and is within the scope of this application.

It is noted that the present disclosure may also be directed to identifying the cause of past traffic increases. That is, the social media input may be used for recognizing traffic increase in any of the cells. This information can then be used in the scheduling process.

In an example according to the disclosure, said step of receiving event information comprises receiving said event information from a social networking website or an event database. Often, the events are available online and the data is made available to the users of a social media networking platform. The inventors consider it to be advantageous to gather such information that is available online. Therefore, it is an option to request event information to such social networking platform or a specialized event database. These platforms may mention the characteristics of the event—such as location, time, date etc. in detail. Alternatively, certain venues, such as concert halls or stadiums, maintain their own individual database together with an event calendar on such social media networking platforms. The event information may be requested to, and subsequently received from, such platforms as well.

Another advantage of events hosted on social media networking platforms are that they often indicate the amount of people going to attend said event, or that are considering to attend the event. Although this figure, in most cases, may not be accurate, it gives a good indication regarding the popularity of the event which can be useful for network adaptation.

It is noted that the format in which the event information being the geographic data and temporal data of events that are to take place, are provided may differ from one social networking website to another. The format may also differ from one event database to another. The method may comprise a step in which the provided formats are made uniform such that a computer readable uniform list is obtained.

In an example of the disclosure, the method further comprises a step of formatting said received information into a predefined uniform data structure. The step is based on the insight that it would be advantageous to format all received event information into a consistent format before processing it further. Therefore, once the event information is received from one or more external sources, the data may be extracted and a common formatting may be applied to it. A common example could be in the date of events. Different platforms could host the information in different formats—for example "ddmmyy", "ddmmyyyy", "yyyymmdd", "mmddyy" etc. just to cite a few. In such a scenario, it would be advantageous to extract the event information and to apply a uniform formatting structure. This would be beneficial in the further steps of the method. While searching or requesting information, multiple formats could be utilised such that all the relevant entries are made available, but in interest of further optimisation of software, it would be advantageous to convert all available data to a uniform format.

In an example of the disclosure, said method of predicting an increase in traffic further comprises a step of combining multiple same events into a single aggregated event, wherein same events are defined as events having a substantially same geographic data and a substantially same temporal data. It is possible that while requesting event information to multiple sources, multiple entries of the same event are made. Thus it would be advantageous to eliminate such multiple entries, thereby not over estimating the crowd size. Several parameters could be utilized while determining whether two or more entries concern the same event.

One criteria could be to check the differences in spelling. If there are only minor spelling differences, it could possibly relate to the same event. This is often in the case of a non-native English word, when written using Latin alphabets. Another common field that is prone to such errors would be the location and the time details. For example, one platform may only provide the exact times during which the event occurs. Another platform may additionally provide the time from which the venue is made open to the public and well beyond the closing time of the event. Such differences should be taken into consideration and checks are performed to combine multiple entries of the same event into one single entry.

An example of the disclosure further comprises the step of filtering and prioritizing said event information, wherein filtering of event information is based on availability of data or a type of venue and prioritizing of said event information is based on a number of people expected to attend said event or popularity of said event. This example is based on the insight that it would be advantageous to consider only those events which are documented and well planned in advance and also to give a higher priority to those that are likely to attract larger audiences. It is often the case that in certain databases, certain key elements concerning the data are missing. This may be a time duration of the event, or venue details etc. In such cases, it would be advantageous, from the point of view of reducing the data to be processed, to avoid events which do not have complete information regarding the venue and/or time.

As also discussed, earlier, the term "events" covers a wide range of social gatherings right from religious gatherings in a small church to book readings at a local book club to rock concerts or football matches. From the point of view of load on a telecommunication network, a gathering of about 20-30 people for a book reading is bound to have a lesser impact than a gathering of about 40000-50000 spectators for a football match. Similarly, a low profile football match is likely to attract lesser spectators than the final of a major tournament. Therefore, it makes sense to prioritize the events based on the expected attendance of the event.

Attendance could be estimated by the nature of the event itself, i.e.—book reading vs. football match. Alternately, attendance could be estimated by following the event on a social media networking platform to find out how many people have expressed an interest in viewing or attending this event. Additionally, the expected attendance could be determined by alternate means such as capacity of the venue, or the number of people that the venue can accommodate, the number of tickets sold etc.

Once the expected attendance for the event is established, it would be advantageous to prioritize the events based on the number of the people attending said event for the reasons explained above. Alternately, it is also possible that events occurring with a certain fixed frequency are predicted by the system itself and necessary network adaptations are made automatically without waiting for the information, filtering and prioritizing.

In an example of the disclosure, said association is based on geographical proximity such that at least one cell of said telecommunication network closest to the geographical location of the event is associated to said event. Once the geographical location of the events is identified, certain cells of the communication network have to be associated with the event. The inventors consider that it would be advantageous base such an association on geographical proximity of the cell to the location of the event. For this purpose, a list of cells of the telecommunication network that fall within a relevant geographical area are selected at first.

Here, a selection of one or more cells from the selected ones is to be done. In order to do so, the distance from the cell to the event location is to be calculated. But first, a uniform reference point within each cell may be established. This could be, for example, the location of the node itself or could be any other point within the cell. In order for simplifying the explanation, it is assumed that the reference point within the cell is the location of the node itself. Once the location of the reference point is established, a distance between the reference point and the event location may be calculated. This could be done, for example, using the haversine formula or the Pythagorean theorem approach. Both these techniques are well documented in the state of the art and are commonly used approaches to theoretically calculating the distance between two points on the surface of the earth when the respective latitudes and longitudes are known. For purposes of brevity, the methods and the relevant calculation procedure itself are not further elaborated here.

In an example according to the disclosure, said method further comprises the step of adjusting operations, administration and management, OAM, processes for said at least one particular access node based on said predicted increase in amount of traffic in said corresponding cell.

One of the possible node adaptations to increase of traffic related to the the planning and deployment of new sites, macro or small. Yet a further option is the assigning of additional bandwidth to cells expected to be crowded. Even a further option is the performing of load balancing techniques, e.g. by antenna tilt, mobility parameters or transmitted power, that allow a better share of the expected traffic with close cells, therefore reducing the impact of the expected increase.

In a further example according to the disclosure, said OAM processes comprises at least one of failure management, preventive allocation of resources, re-planning, energy saving, and optimization. These processes are routine processes undertaken to ensure that the network function effectively without any inconvenience to the end users. Once particular cells are associated with one or more events, certain OAM procedures may be performed on the cell. This can be to ensure that cell is capable of handling the additional network traffic without failure. Alternately, the bandwidth and power output of a particular cell could be decreased after the completion of the event so as to conserve energy.

An alternative option could be to provide a list of events and associated network cells and nodes in a printable format such that it may be understood by a user such as a network operator or a maintenance engineer. In the absence of automatic regulatory mechanisms, such a user could make the necessary adjustments in the system.

In accordance with the present disclosure, different aspects applicable to the above mentioned examples of the methods, including the advantages thereof, correspond to the aspects which are applicable to the devices of the communication network.

In a second aspect of the disclosure, there is provided a node for use in a telecommunication network arranged for predicting an increase in the amount of traffic in a particular cell of said telecommunication network, wherein said telecommunication network comprises a plurality of access nodes, wherein each of said access nodes is arranged to serve a cell in said telecommunication network, wherein each cell covers a predefined coverage area.

The node comprises an information acquisition module arranged for receiving event information from at least one external source, wherein said event information comprises geographic data and temporal data of events that are to take place, a cellular network association module arranged for associating said received events with at least one particular access node of said plurality of access nodes based on said geographic data of each of said events and based on said predefined coverage areas of said cells, an output module arranged for predicting an increase in amount of traffic in a cell of said telecommunication network based on said associated events with at least one particular access node and their corresponding temporal data.

The advantages of the first aspect of the disclosure being a method of predicting increase in cellular traffic in a communication network are also inherently a part of the second aspect of the disclosure. Furthermore, it is pointed out that although the claims read as if all the modules according to the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules as such.

The information acquisition module is responsible for receiving information pertaining to events from external sources. The information thus received is subsequently passed on to the other modules within the node.

In an example according to the second aspect of the disclosure, said information acquisition module is further capable of requesting said event information to the plurality of external sources. As was mentioned earlier, it would be advantageous to receive relevant information from external sources. Therefore, the information acquisition module, is further capable of requesting information to external sources such as social media networking platforms and event databases.

In an example according to the second aspect of the disclosure, said information acquisition module is arranged to receive said event information from a social networking site or an event database.

In another example according to the second aspect of the disclosure, said information acquisition module is further arranged to format the received information into a predefined uniform data structure.

In another example according to the second aspect of the disclosure, said information acquisition module is further arranged for combining multiple same events into a single aggregated event, wherein same events are defined as events having a substantially same geographic data and a substantially same temporal data.

In an example according to the second aspect of the disclosure, said node further comprises a social filtering and ranking module arranged for filtering and prioritizing said event information, wherein filtering of event information is based on availability of data or a type of venue and prioritizing of said event information is based on a number of people expected to attend said event or popularity of said event.

In an example according to the second aspect of the disclosure, said association is based on geographical proximity such that at least one access node closest to the geographical location of the event is associated to said event.

In an example according to the second aspect of the disclosure, said output module is further arranged for adjusting operations, administration and management, OAM, processes for said at least one particular access node based on said predicted increase in amount of traffic in said corresponding cell.

In an example according to the second aspect of the disclosure, said OAM processes comprises at least one of failure management, preventive allocation of resources, re-planning, energy saving, and optimization.

In an example according to the second aspect of the disclosure, said node is located within a access node of said telecommunication network or located centrally in a server. It is realised that the node is an access node of the telecommunication network or the node is centrally located server unit that performs all the functions according to the present disclosure.

In accordance with the present disclosure, different aspects applicable to the above mentioned examples of the methods and the nodes, including the advantages thereof, correspond to the aspects which are applicable to the devices of the communication network According to a third aspect of the disclosure, there is provided a computer readable storage medium comprising instructions which when loaded on to one or more nodes in a telecommunication network are arranged for performing any of the methods as explained above.

In this aspect of the disclosure, a computer readable storage medium is provided with instructions that enable a system on to which said storage media has been loaded to perform the method according to the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
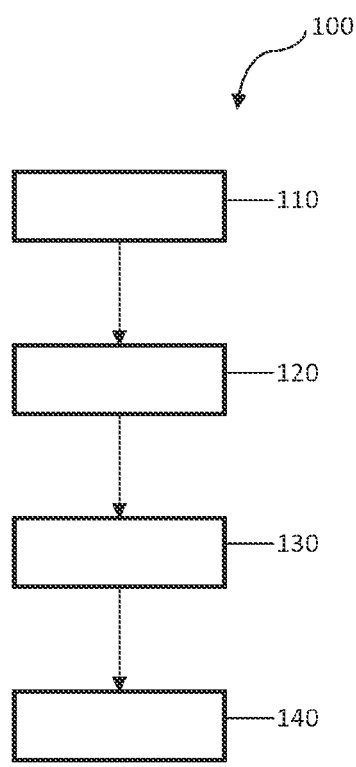
FIG. 1 is a schematic chart illustrating the basic steps involved in the method according to the present disclosure.

FIG. 1 is a schematic chart illustrating the basic steps involved in the method 100 according to the present disclosure. The first step 110, is the step wherein event information pertaining to events is received. This event information comprises at least geographical and temporal details regarding the event. Once said information is received, the information is filtered and prioritized at the next step, 120. Filtering can involve getting rid of multiple entries pertaining to the same event or alternately, events with incomplete information may be removed from the list of events.

In the step of prioritizing, certain events are given a higher priority than other events. The basis for such a ranking could be any of a number of factors such as popularity of event, expected attendance, capacity of venue, tickets sold etc. Although popularity of an event is an abstract concept, it could be quantified, by considering the number of people who have expressed interest in attending the event. Such information is usually available on a social media networking platform. Alternatively, past attendances of the event could be used as an indicator of the popularity of the event. In any case, events with more popularity and higher number of expected attendees are typically given a higher priority.

Once a prioritised list of events is generated, the events are associated 130, with one or more cells in a telecommunication network. That is, the events are associated 130 with at least one particular access node of the plurality of access nodes based on the geographic data of each of the events and based on the predefined coverage areas of the cells. The reason for performing this step after prioritisation is so that association may be done only for higher priority events.

One of the effects of the present disclosure is that the parameters of a network may be adapted such that the network is able to function effectively even in cases of increased cellular traffic. One of the insights of the inventors is that events with low attendance and consequently a low priority are unlikely to affect the normal performance of a telecommunication network.

Consequently, once one or more cells of the telecommunication network have been identified and associated with a particular event, an increase in cellular traffic may be predicted, 140, for these cells, depending on the available bandwidth and the predicted increase in the number of people being serviced by said cell.

The method according to the disclosure is further elaborated together with the node according the disclosure. An exemplary example according to the disclosure is further analysed using the figures.

Figure 2:
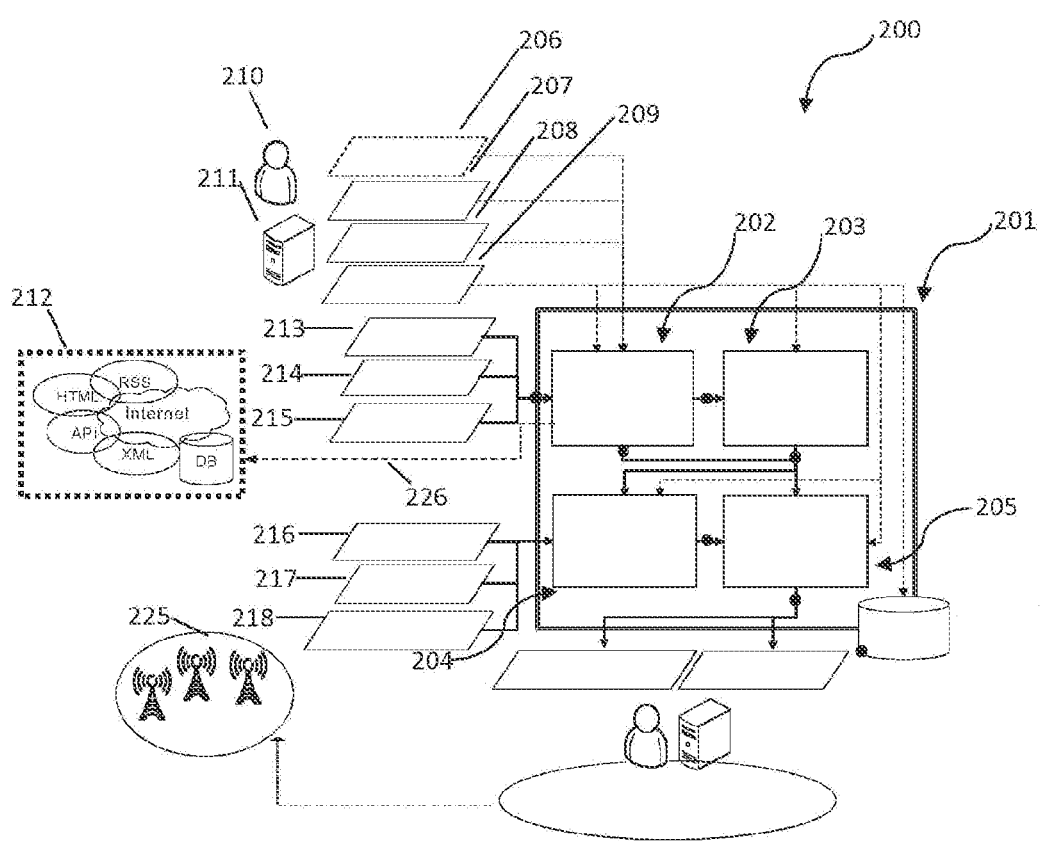
FIG. 2 is a schematic chart illustrating an example of the system.
Figure 3:
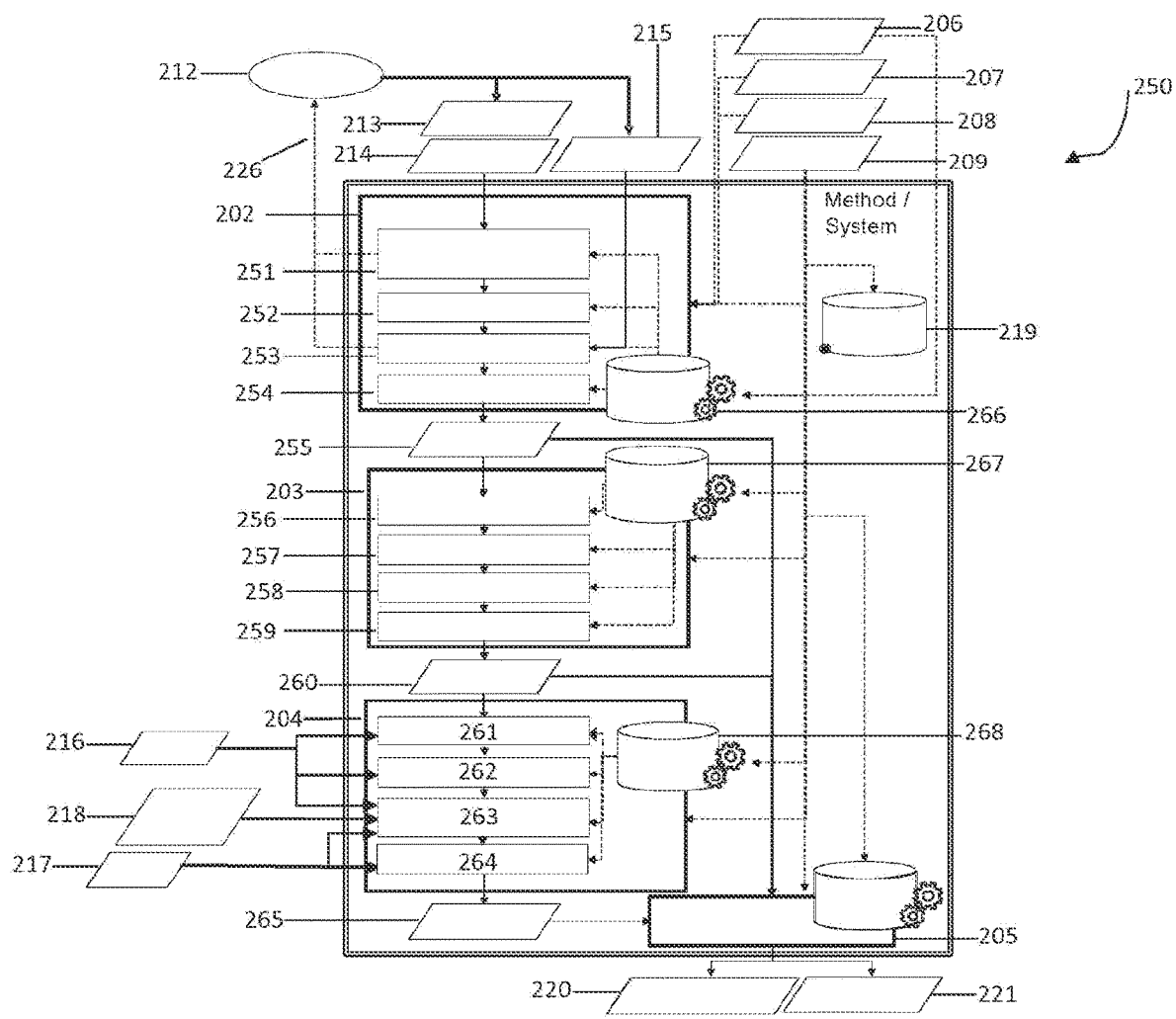
FIG. 3 is a schematic chart illustrating another example of the system.

In FIG. 2, System 200 shows an exemplary example of the disclosure. The system 200 in general consists of a node, 201, in a telecommunication network, 225. The node has an acquisition of social information module, 202; a social filtering and ranking module, 203; a cellular networks association module, 204; and an output module 205. The system 200, of FIG. 2 is also shown as system 250 in FIG. 3. The illustration according to FIG. 3 is more detailed in that it shows the various subcomponents of the aforementioned modules. In the following discussion regarding the system, reference will be made to both FIG. 2 and FIG. 3 interchangeably. It is to be understood that wherever possible the same reference numerals have been applied to the same or a similar component or to the component that performs the same or essentially similar function. Another aspect to be understood is that the following description applies equally to both the method as well as the system.

The main function of the acquisition of social information module, hereinafter referred to as the acquisition module, 202 is to capture the events/venues information from the different social sources 212, and to parse the information into a common internal format and to merge the information captured form different sources 212. The output of the acquisition module, 202, is a set of formatted event data containing the details on the different events/venues that is to be passed on to further stages of the system. The external sources typically include event aggregator webpages, venue/city calendars, browser results, social media network platforms and even data that may be manually input. The social information obtained from the sources can be in multiple formats, for example databases, Hypertext mark-up language, HTML, webpages, Application Programming Interfaces, APIs, Rich Site Summaries, RSS, feeds, data files or any other available format.

The external source provides raw event data, 213, Raw venue data, 214, and Consolidation information, 215. These are made available to the relevant subcomponents in the acquisition module, 202. Raw events data, 213, comprises available details about the scope and characteristics of the events to be acquired such as geographical area, date ranges etc. These may include the start time and end time of an event, latitude, longitude information of the location, type of event, i.e. sport, musical, parade etc. It could also include additional information such as venue address, popularity of event as determined by the original source of said information.

The raw venue data, 214, comprises information about the characteristics of the venues of interest. This information might be available together with the event information or alternatively, such information might have to be separately requested and received from an additional source such as a dedicated website about the venue. The raw venue data includes, latitude, longitude of the venue's location, number of events being organised at a venue within the specified time range. It may also include, additional characteristics such as capacity of the venue or an average popularity of events occurring at said venue.

Finally, the event or venue information coming from some external sources typically contain some inconsistencies in terms of the precision of the geographical coordinates or address formatting. In such situations, the consolidation information input, 215, is made available to the acquisition module, 202. The information is usually derived from additional external sources such as geolocation services or address formatting tools. Therefore, these errors can be corrected.

The acquisition module may, primarily, receive four inputs—Sources access procedure, 206, Temporal scope of interest, 207, Geographical scope of interest, 208 and Execution configuration, 209. Sources access procedure, 206 refers to the mid/long term parameters and mechanisms related to the access and retrieval format of the external information sources. These can include the details of access and parsing for both the cellular network and the social sources—for example, Uniform Resource Locator, URL, Internet Protocol, IP, addresses, Application programming interface, API, Database call structure etc. Depending on the source, it could also incorporate mechanisms or codes that are able to execute the access and retrieval of information. The sources access procedures input is optional as they can already be predefined in the system, although it can be changed/updated if required by authorized human operators, 210, or an external automatic mechanism, 211, in order to incorporate new sources, adapt to access changes or reply formats etc.

The next input is the Temporal scope of interest, 207. This could often be range of dates specified by a start date and an end date. Another option could be a specific date in combination with a time range specified by a start time and an end time. It is however evident that any possible combinations of date and time may be used in order to specify a time period of interest.

The third input is a geographical scope of interest, 208. It specifies the area of interest to be analysed. This area need not necessarily only relate to a particular node. For example, if the disclosure according to the present disclosure is implemented centrally, in a central server, the area of interest will be a much larger area which almost entirely covers the service area of the network provider. There are several ways in which a geographical scope of interest may be defined. It could be defined based on a string of text such as city, region, province or a country. Alternately it could also be defined using geographical coordinates specifying a range of latitude values—using a minimum latitude and a maximum latitude, and a range of longitude values—using a minimum longitude and a maximum longitude. Yet another option is to specify a central point—either as a string address or as a set of geographical coordinates—and define an area around said central point by specifying a radius.

The functioning of the acquisition module, 202, is further explained in view of its various subcomponents. The acquisition module, 202, requests, 226, event information to external source, 212 based on the various inputs and established procedures, 206-209. Subcomponent 251, is responsible for capturing the information from one or more external sources. In this way, following the social access procedures, 206, and parameters (type of connection, address, call format), this subcomponent generates the requests, 226, demanding the events/venues information available for the defined temporal, 207, and geographical, 208, scopes of interest.

For this subcomponent, and the rest of the subcomponents in the acquisition module, 202, the sources access procedure, 206, can be introduced as an input. However, typically, one or a specific set of sources would always be used, keeping the same formatting and details for long periods of time. Therefore, the access procedures can be already included in the system, via a database (not shown) or coded procedures in the social access parameters and procedures element, 266. Additionally, an execution configuration parameters input, 209, or stored configuration can modulate the type of requests. For example, making use of just some sources for the set of available sources or defining a maximum number of events/venues to be acquired.

Once the event/venue information is received, subcomponent 252 is responsible for parsing and/or formatting the received information. The desired or expected output format is defined in the social access procedures element, 266. The obtained information is stored following a common internal data structure independent from its original form. This internal format unifies the identification of different fields of the events/venues information. Since the data may be received from multiple sources, it may be advantageous to ensure that all the available data is made available to the later stage in a uniform structure so that processing is made easier with less chances of errors.

The next subcomponent 253 is responsible for consolidating data. The information provided by some sources could present some inaccuracies in terms of address format, name misspellings, erroneous or lack of geographical coordinates etc. To overcome these issues, some support of social sources/tools such as internet sources, databases can serve to complete and correct the elements data. Such external data that may be required is also requested, 226, as and when deemed necessary by the system.

This consolidation could also be performed after posterior semantical filtering of the processing block, which might reduce the number of events to be considered. However, if performed at this stage, it allows to further confirm the details before further analysis.

It is possible that the same event data is retrieved multiple times since data is requested and subsequently received from multiple external sources. Furthermore, the same event might have been hosted in the same website multiple times for some reasons. Such copies can lead to an unnecessary increase in the number of data rows considered and also could lead to over estimation of expected attendance of the event. The subcomponent 254 is in charge of eliminating duplicates by discarding elements with same or very close names and dates than already existing ones. Also, some of the repeated events can be used as part of the consolidation of acquired data, 253, for example, by confirming that the same event details are shared between the different sources. Thus the output, 255, available from the acquisition module, 202, is formatted event data.

The next module is the Social filtering and ranking module, 203, hereinafter referred to as the filtering module. The main purpose of the filtering module, 203 is the pre-selection and ranking of the event information of interest based on the acquired and formatted event data, 255. Based purely on social data and not cellular one, different filtering and ranking procedures can be applied to reduce the number of events to be processed in later stages, as well as to classify the events depending on their expected relevance. As an output of this module, a set of filtered and prioritized event data, 260 is produced. Within this module, multiple procedures are possible, and they could always be turned on or off and their parameters defined based on the execution configuration input, 209. These parameters/procedures can also be pre-configured and stored internally in the filtering/ranking parameters and procedures element, 267. This module has four major subcomponents which are discussed briefly.

The first subcomponent, 256, checks for available data. Although this check was performed within subcomponents 253, 254, there is a possibility that some data might still lack information in some key fields such as start time, location. The unavailability of such field might make the event useless for the system purposes. Therefore, it might be a good idea to delete such data or to minimize their ranking.

In the next subcomponent, 257, the data is filtered based on geographical coordinates. Even if the acquisition module, 202, demands for elements from a certain area, the external sources, 212, might return some data outside the intended geographical scope, especially if it was defined by a string. Such data is filtered based on execution configuration input, 209, or stored geographical limits.

The parameters used by this subcomponent can be the same or different ones provided for the acquisition elements in 251. For example, for the acquisition, typically a string geographical scope would be applied. Meanwhile in the filtering, 257, geographical coordinate limits would be applied. Different geographical filtering and ranking are possible, such as square area or circular area.

A square is defined by specifying a minimum and maximum longitude and a minimum and maximum latitude. The event coordinates are compared against these values to ensure that the even falls within said area.

A circular area might be defined by selecting a central point. This central point could be for example, the location of a node of interest in a telecommunication network. Alternately, it could also refer to a particular geographical point of interest, such as the city centre or a shopping centre etc. Once a central point has been defined, a radius is defined and it is checked whether the event location falls within the circular area described by the central point and the radius parameter. One way to check this, is to determine the distance between the central point and the event location and to check whether this distance is lesser than the specified radius. If so, the event location, is within the area of interest. The distance between two geographical points may be calculated by several methods. Two common approaches are by using the haversine formula or the Pythagorean theorem. Both these approaches are well documented and are known to the person skilled in the art.

The next filtering subcomponent, 258 is responsible for Semantic processing. Based on the string/text information acquired for each event, some of them can be discarded or low-ranked. These semantic filtering can be performed analyzing different aspects of the semantic data of the event, such as, but not limited to:

Key terms: based on the presence of different words in the data fields, it might be estimated which elements have little or no relevance in the cellular network (given that they will not generate large crowds or high capacity demand). For example, the elements that include in its venue, the terms 'bar', 'cafe', 'coffee', 'pub', . . . }, may be discarded, as they typically imply small venues, with reduced capacity. The terms re checked, as well as all the filtering parameters (terms, value limits) in the rest of the submodules, which can be provided as an execution configuration input, 209, or be pre-configured in the system in the filtering and ranking procedure element, 266.

Elements category: If, as typically provided by social sources, the type of event is available, e.g. if it is a sport event, a concert, parade, etc.; it is also possible to automatically filter out those considered non-impacting or uninteresting for the analysis. As an example, an event that is listed with type as "sporting event" may attract a larger audience than another event with type listed as "book reading".

Address/dates: Even if the acquisition calls are performed by demanding events for a certain area or dates, the external sources might return some that are outside the intended geographical or temporal scope and identifiable semantically. To correct these, address hierarchical details (street, region, etc.) and date information can be applied for filtering of elements outside the intended scopes (especially step 257 is not applied or their defined limits are too wide).

The next filtering procedure, 259, performs a numerical processing of the data in order to filter and prioritize the available data. Some of the fields and characteristics of the events/venues have a numerical nature and therefore can be processed as the input for ranking and possible filtering. Key examples are the attendance indicators of the number of participants/attendees of an event. These include, but are not limited to:

the number of tickets sold, the capacity of the venue, the popularity indicated by the original source, as some social sources allow to retrieve the information ordered by their own calculated POPULARITY or providing a field with such information in a numerical manner.

the revealed preferences (e.g. number of "likes") and/or social expectancy (e.g. number of webpage "hits") acquired from the original source by components 251, or by the details consolidation submodule, 253, coming from social networks, 212, or news media.

These indicators might be directly used for numerical filtering/ranking or applied as input to compound an estimation of the number of attendees.

These filtering and ranking procedures may be executed one after the other in the sequence listed above. However, it is also equally possible to pursue another order or to not include certain filters. In either way, the output of module 203 is a list of filtered and prioritized events, 260.

The next module is the network association module, 204, hereinafter referred to as association module. This module is dedicated to establish the relation or association between the filtered and prioritized event data, 260, and the cellular network, 225. This can be done at different levels, by the identification of those sites, cell and/or metrics that had been or are most likely to be in the future impacted by specific social events or venues. The various subcomponents within this module may be active depending on the available inputs. Also the different parameters and procedures that will be described can be preconfigured in the system in the network association parameters and procedures element, 268. Alternately, it may be provided as part of the execution configuration inputs, 209.

In addition to the inputs already mentioned earlier, this module requires three additional inputs. The first of the three additional inputs are the network details, 216. Network details, 216, includes the information about the cellular network, especially the cellular base stations, BSs (may also be referred to as "sites"), and cell sectors, including but not limited to the geographical position of the sites and the azimuth of the cells—if the sites are directive or sectoral.

Another input that is provides is the network metrics, 217. The network metrics, 217, refers to a time series indicating the values of an indicator, Key Performance Indicator (KPI), counter, alarm, trace or any other network parameter that is variable in time. The list of parameters provided is merely indicative and not exhaustive. Another possible parameter is the hourly number of drops or the throughput of each cell.

Finally, additional network measurements, 218, may also be provided as an input to the system. These measurements relate to additional detailed data information about the network, such as geo-located terminals, drive test data etc., that may be available. This information can be applied to further refine the analysis of social events or their venues.

Figure 5:
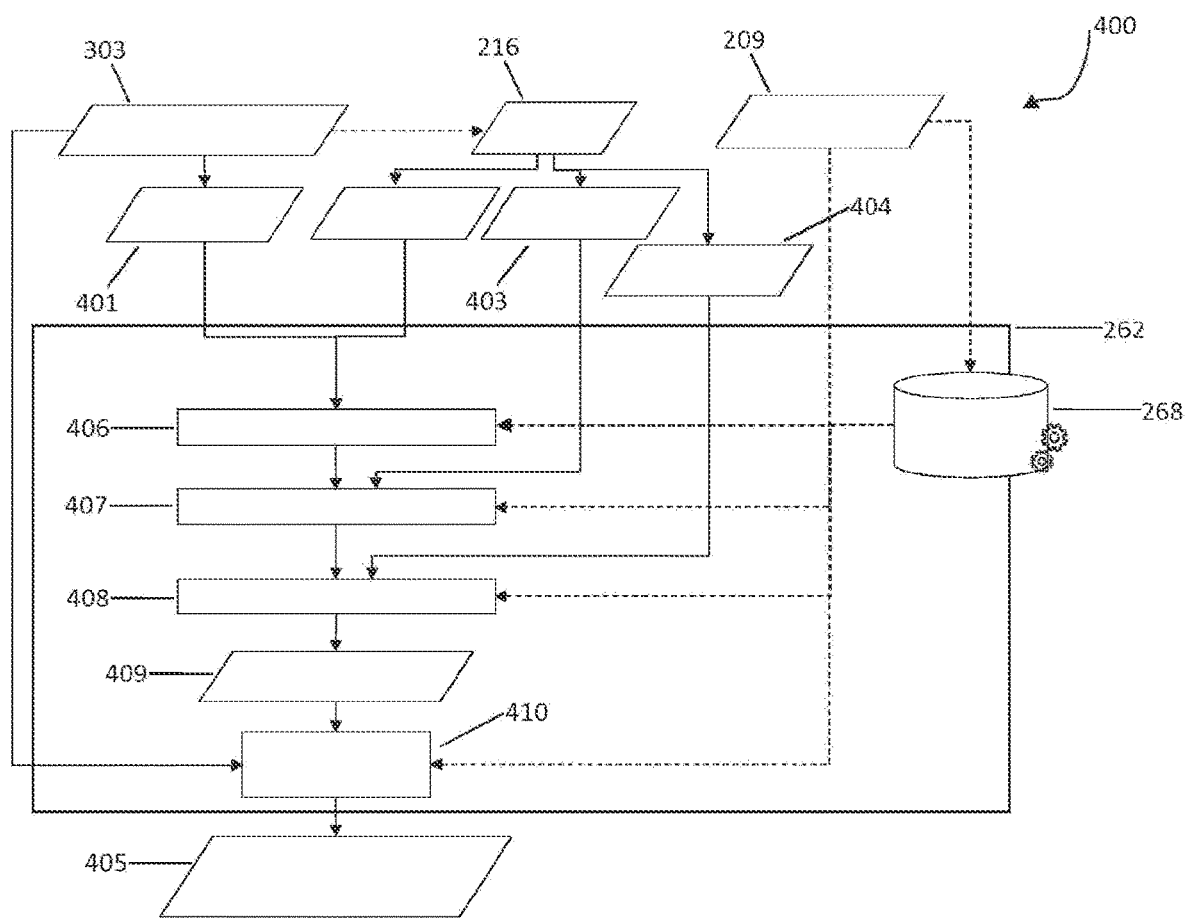
FIG. 5 is a schematic chart illustrating an example of the system.
Figure 6:
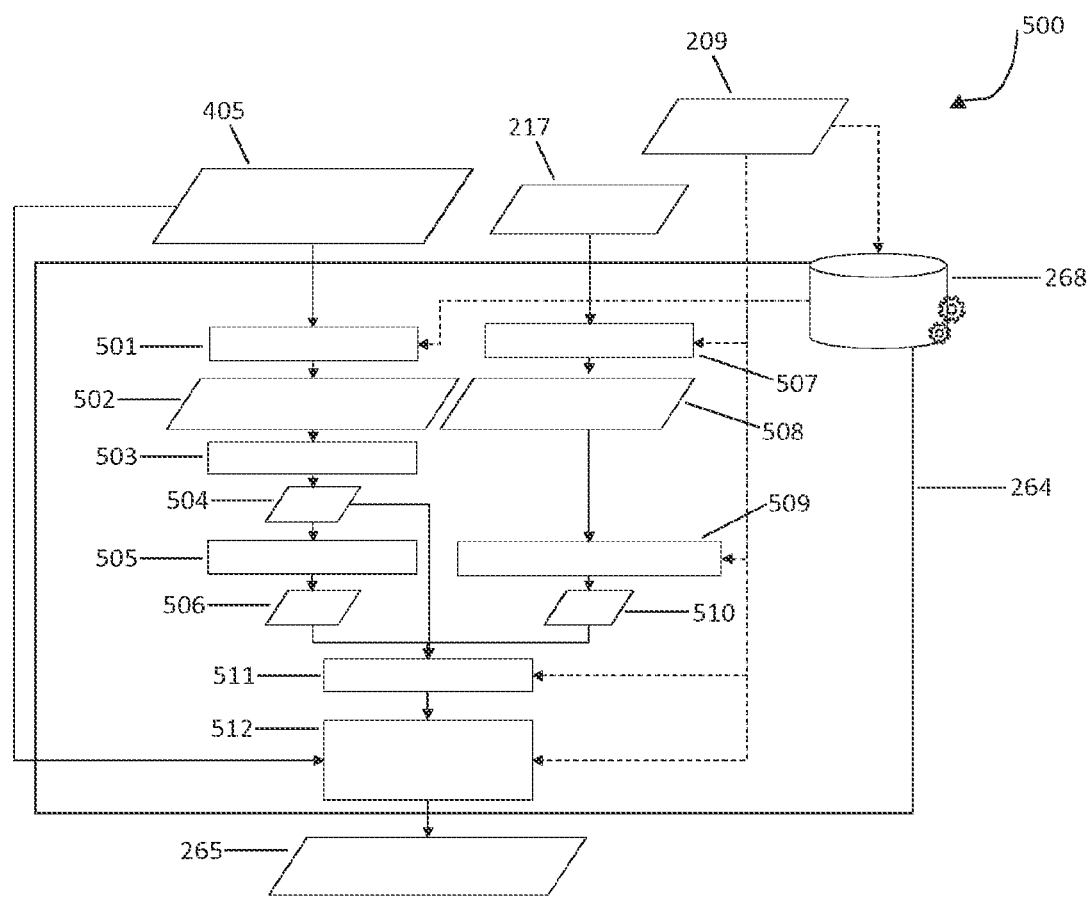
FIG. 6 is a schematic chart illustrating an example of the system.

The various subcomponents of the association module, 204, interact with one another in order to generate a list of associated network and event data, 265. The various subcomponents are further elaborated using FIGS. 4, 5, and 6.

Figure 4:
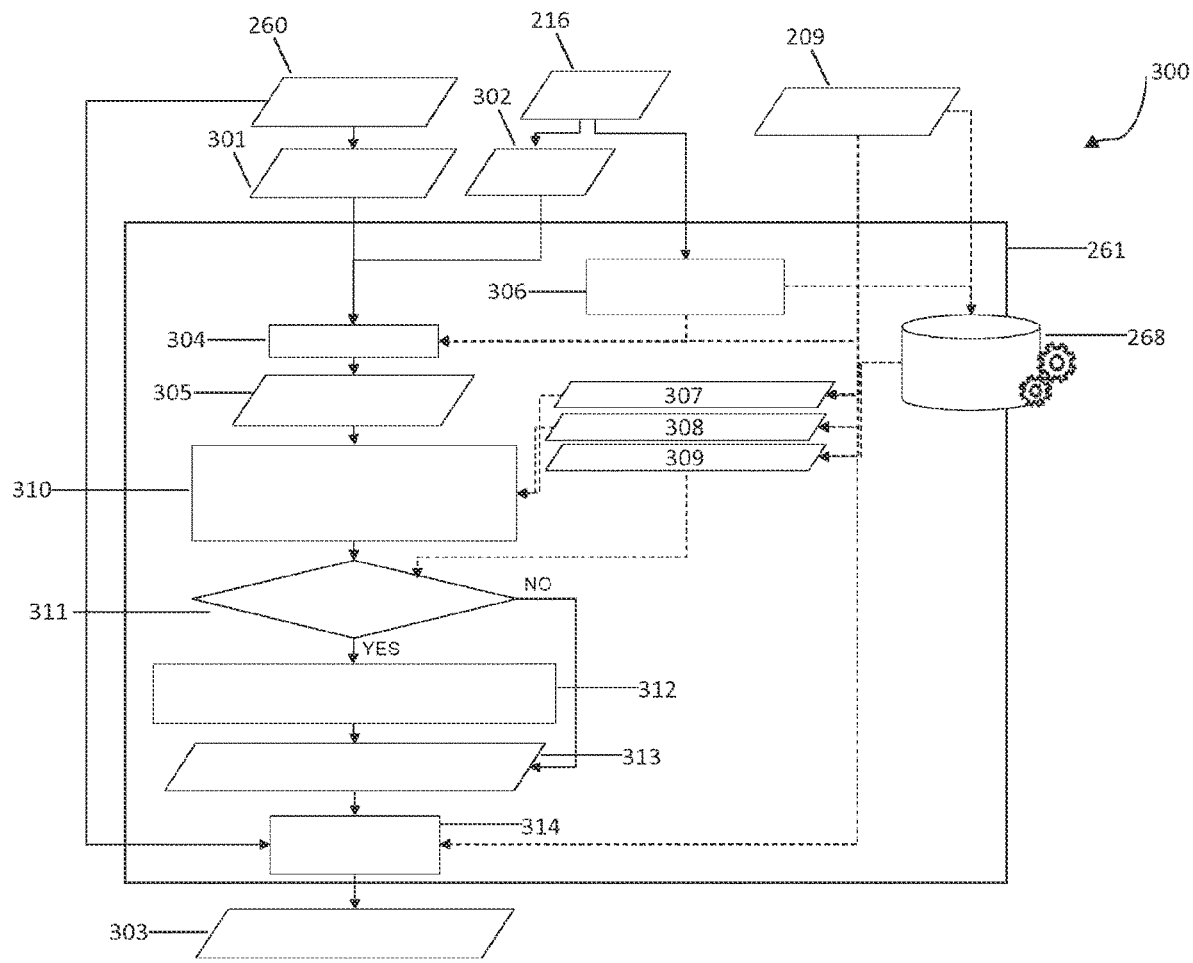
FIG. 4 is a schematic chart illustrating an example of the system.

In FIG. 4, reference numeral 300 indicates the detailed flowchart/functioning of subcomponent 261 in order to determine the closest sites. This subcomponent utilizes three inputs—the list of prioritized events, 260, received as the output of the previous module, information about the cellular network, 216, and general configuration parameters relating to the execution, 209. This block allows finding the closest sites to each event/venue. The subcomponent is defined for network entities whose distance to an event is relevant (e.g. typically those providing end-users radio access BSs, relays, etc.) and it would not be significant for other network entities (e.g. core elements).

In this process, different configuration parameters can be defined:

MAX_NUM_CLOSE_SITES, 307: maximum number of sites to be listed per event.

MAX_DIST, 308: Maximum distance between an event and a site to be considered as a close site.

MIN_NUM_CLOSE_SITES, 309: minimum number of sites to be listed per event.

These parameters, as well as the type of distance calculation, can be preconfigured, passed as inputs or estimated from the cellular network details, e.g. reducing the MAX_DIST in dense cellular environments based on the average distance between the sites. This "on the fly" configuration would be performed by the parameters estimation submodule, 306. Furthermore, these parameters may be previously specified in the system within network association parameters and procedures element, 268. Of particular interest for this subcomponent, are the physical location of the event and the network element, hence these details are specifically extracted. Particularly, the location details regarding the event, specifically the geographical coordinates, 301, are used from the filtered and prioritized list of events. This information is used in conjunction with geographical coordinates of the network element, 302 in order to determine a distance, 304, between the network element and the event.

It may be desirable at this point, to generate a list of network elements, 305, for each event such that the list, 305, is ordered in terms of distance between the event and various network elements. The next step, 310, would be select the closest sites to the event based on the defined parameters such as maximum number of sites, minimum number of sites and maximum distance between network element and event. Here it becomes evident, why it was advantageous to order the network elements for each event based on the distance between them in the previous step, 305. The person skilled in the art realizes, however, that it is possible to achieve the desired output without performing the sorting in the previous step and by merely performing all comparisons in the next step.

As an example, one way of achieving the result is by selecting the first S (for example) sites from the list of sites such that the distance, 304, between the network element and the event is less than the maximum distance, 308 and also such that the number of selected sites does not exceed the predefined value of maximum number of closest sites, 307. It may be the case sometimes that no, or not enough network elements meet the criteria of distance. For example, it may be desired that for an event at least 4 network elements be associated with a particular event. However only 2 network elements fall within the defined distance. In such a situation, it is evaluated, if S is less than the minimum number of sites, 309. This evaluation is performed in step 311.

If it is determined that the selected number of sites, S, is indeed less than the specified minimum number of network elements, 309, the next few network elements in the list, 305, are included. The number of sites to be further included depends on the present difference between S and the specified minimum number of network elements, 309. In other words, in step 312 it is ensured that in case, the minimum number of network element criteria, 309, is not met with, at least a minimum number of network elements are selected from the list 305. If, however, it is determined in step 311 that the number of selected network elements, S, is not less than the minimum number of desired network elements, 309, the step selecting additional network elements is avoided.

As an output, a list of S closest network elements to the event is produced, 313, and the list is ordered according to the distance between the network element and the event. Furthermore, it is desirable to add these details, 314, of the associated network elements to the event details. As a completer output, 303, of this subcomponent, a list of filtered and prioritized events is generated with the selected closest sites to said event.

The next association is performed in terms of the cell bearing, 262. In the previous step, a number of network elements that were closest to the event were selected. However, the bearing/orientation of all these selected S network elements might not be relevant to the event in question. Hence it may be advantageous to associate only those network elements with the event such that their orientation is also relevant. This step in itself is only relevant to certain network elements such as cells or sectors. For other elements, like complete sites or core elements, the bearing is not definable or significant.

Reference numeral 400 refers to a system/method for associating network elements to events based on the orientation or bearing of network elements. The relevant inputs that are required are the list of filtered and prioritized events together with the selected closest sites to said events, 303 as produced as an output by the previous subcomponent. In particular, the geographical coordinates of the event, 401 are utilized form the list. In addition to the network details, 216, the cell azimuth, 403, and the horizontal width of the cell, 404, are considered. The cell azimuth, 403, refers to the angle between the maximum of its radiative pattern and the north. This angle is usually expressed in degrees. Any other suitable unit such as radian may also be employed. The cell horizontal width refers to the angular portion of a circle centred in the site that it should be covered by the cell sector. The cell width is usually but not always expressed in degrees and for the horizontal plane. For example, the sectors of a trisectorial site would have typically an equal horizontal width of 120°. For omnidirectional sites the cell horizontal width would typically be of 360°.

In order to perform achieve this association, a sequence of the following steps is to be performed. These steps are preferably carried out in the following sequence, but it is not mandatory that they be carried out in the same sequence as listed. The first step, 406, is to calculate the bearing of the site with respect to the event. The site-event bearing, 406, is the angle degrees away from North of the considered event in respect to the site. Two common approaches for this calculation are again using Pythagorean theorem or haversine formula approaches.

Secondly, the cell-event bearing, 407 is calculated is derived from the site bearing. From the site bearing, each of its cell-event bearings, 407, is calculated as the difference between the site bearing and each cell azimuth, 403. Having the cell azimuth, 403, and the site-event bearing, the cell bearing may be defined as:

```
diff = bearing(SITE, ELEMENT) – CELL.AZIMUTH
IF diff > 180,
diff = diff – 360
ELSE IF diff < –180,
diff = diff + 360
ENDIF
bearing(CELL, ELEMENT) = abs (diff);
```

Thus initially, a difference (diff) between the site-event bearing, 406, and cell azimuth, 403, is calculated. If this difference is found to be greater than 180 degrees, the difference is re-defined by subtracting 360 degrees from the present value of the difference. If, on the other hand, the value of difference is obtained as less than –180 degrees, 360 is added to the present value of the difference. At the end, an absolute value of the difference is assigned as the cell-element bearing value, 407. Due to the actions performed, the value of cell-event baring, 407, is a positive value between 0 and 180 degrees.

In the association step, 408, an association based on cell bearings is performed. Low values of cell-event bearing value, 407, indicates that the cell is oriented towards the event. Particularly, if the cell-event bearing is less that the cell horizontal width, 404. Since only positive values are expected for the cell-event bearing, 407, the value needs to be compared only with half the value of cell horizontal width, 404. Therefore, bearing(CELL, ELEMENT)<CELL. HOR_WIDTH/2→cell is considered associated; otherwise→cell is not associated.

As explained earlier, a cell is associated with the event if the cell-event bearing, 407, is less than half the value of the cell horizontal width, 404. Once the association is performed, a list of bearing associated cells is generated, 409. The details are then subsequently appended to the existing list in step, 410. As an output, 405, a filtered and prioritized list of events is created with a list of closest network elements together with the identity of those network elements whose bearing is relevant. The output, 405, of this block can be in the form of additional fields for the event, including the list of bearing associated cells per event as well the cell-event bearing, 407, values or any other quantification of the association.

Different network details (e.g. propagation models) or additional network measurements, 218, (e.g. radio maps, geo-located terminal traces, drive tests) and other methods could be also applied to complement or substitute the other cell association stages. Such alternate associations are performed in the step, 263. Depending on the type of alternative association, 263, this submodule could be applied at any point of the association module, 204. However, the stage after cell bearing, 262, and before the further metric-based correlation, 264, is identified as the a priori most suitable in order to reduce the number of cell-metrics to be analyzed in that submodule.

For example, the network load generated by the events/venues could be estimated by the system from the acquired social and network data. This can be done with different levels of detail and format depending on the needs of the posterior OAM tasks: number of participants per event, spatial participant maps (users per area), offered traffic maps (e.g. demand in erlangs per area unit), network load (e.g. in percentage of cell capacity), etc.

Depending on the desired load estimation, future network load could be calculated making use of, but not limited to, the following information acquired/calculated by the system:

Attendance indicators: As described in the numerical processing, 259, submodule, these can include SOLD_TICKETS, CAPACITY, POPULARITY, REVEALED_PREFERENCES, SOCIAL_EXPECTANCY or a compound estimation of the number of attendees.

Event/venues characteristics (for the estimation of the average traffic demand per attendee): for example, the TYPE of event (e.g. a concert is expected to generate more mobile traffic per participant by photo and video sharing than a conference) or venue (e.g. an open-air stadium or park might imply more traffic per user than an indoor location).

Network details, metrics and/or additional measurements (for the traffic load in the network and per associated cell): the generated relative load would depend on the distribution and capacity of the cells (e.g. allocated bandwidth) and its estimation can be based on the impact of previous events (such as the number of served terminals) and geo-located terminal traces and serving areas information, etc. Additionally, these network parameters can be also applied as additional input to estimate number of participants and the traffic demand.

Different types of combinations of these inputs are possible when the proposed system is not limited to any of them, focusing in the metric-based correlation, 264, for the estimation of events impact in the cells.

Finally, a metric based correlation, 264, may be performed if the cellular network metrics, 217, are available. The metric based correlation refers to the assessment of the level of statistical dependence between the metrics and the individual social events, or the set of a particular venue. In this way it is possible to obtain a quantifiable assessment of their level of impact of the social elements on each network-metric. A method of establishing such a correlation is explained in FIG. 6 in reference numeral 500.

The initial inputs needed to perform such a correlation are the list of filtered and associated list of events, 405, and the network metrics, 217. As mentioned earlier, the network metrics refer to values of key network variables such as Key Performance Indicator (KPI), counter, alarm etc. together with a time reference for each value. Following this step, associations between different set of events and network metrics can be performed. For example, the impact of one event in a network metric or the general impact of a venue in a cellular metric. This block may also be executed repeatedly to cover all events, venues, cell or metrics of a certain deployment or just a specific set of event from amongst them. A more detailed method of performing said correlation is explained below.

In a first step, 501, certain events are selected. The event selection, 501, consists in gathering which events would be considered. In this respect, events can be analyzed individually, where the resulting events to correlate variable, 502, would only contain one element, launching the complete metric based correlation module, 264, sequentially for each event to be analyzed. However, for the case of the correlation of a venue with a cell, all the events hosted in that venue are included in the events to correlate variable, 502. In this way, as the output of this block, a set of one or more events will be provided to the next phase.

In a parallel step, 507, a metric selection is also performed. This merely involves the selection of parameters on the basis of which correlation should be made. A subset of all available network parameters could be chose. In terms of the metrics, any set of network metrics could be used as input (e.g. accessibility, retainability) or those related with the traffic that a crowded event would generate (number of users). This step produces a list of metrics, 508, that is to be used as in input for further stages.

Before the association, the cellular metric can be normalized, 509, in order to avoid the normal changes in the metric (e.g. daily traffic pattern) and properly assess the social events impact. The normalized cellular metrics are then provided as an array x[n], 510.

For each event in the set of events to correlate, 502, the next step of social windowing, 503, defines an events correlation window, ECW, 504. Each ECW, 504, identifies the epochs (or index) of the cellular metric samples to be considered in the association between an event and the metric, delimiting the temporal range of analysis.

The ECW, 504, will identify the epochs surrounding each of the event's start time, rounded to the closest cell-metric epoch (e.g. to the closest hour on the hour). The event itself would be considered, from a cellular impact perspective, to start affecting the network a predefined number of samples before the rounded start time and for a predefined duration of samples. In order to provide a margin for association, a certain margin may also be defined for each of the number of samples before the start time and also the duration of samples.

Each event duration and the margin thereof can be defined based on expected duration of the event and its type. It may be also based on other parameters related to the end time of the event and a suitable margin thereof. All of the previously mentioned parameters could be fixed constants applied equally to all events or can be defined for each individual event based on its characteristics.

Once the ECWs, 504, have been defined, different procedures can be applied for the association between the events and the cellular metric values. For example, this might include a simple slope detection in the ECWs. However, as the baseline system, the generation of a social-KPI and its correlation, 505, is implemented, as it provides quantitative feedback on the level of association.

In order to perform the correlation a social-KPI, s[n], 506, is generated. s[n], 506, consists of a metric based on the ECWs, 504, and, optionally, other parameters, such as the events popularity or if it is an "all day" event. Also considerations related to the hour of the event and the normal duration of the type of event considered (e.g. a parade) can be taken into account in the generation of s[n], 506.

s[n], 506, for the epochs of each ECW, 504, will be assigned with a minimum value, MIN_VALUE (e.g. 0 by default). Then, for the event samples different approaches can be used to value s[n], 506. The presented approach is to use a normal-like distribution with mean equal to the middle of the ECW, 504, and a standard deviation, σ, depending on the expected slope of the event impact (for example, standard deviation, σ=duration of event/6).

Finally, s[n], 506, and the desired cell-metric, x[n], 510, are compared, 511, in order to find the level of dependency/association of both variables. Different types of statistical associations are possible. When the proposed solution is not limited to any of them, the Pearson correlation coefficient, represented as $r_{ECW}$, is proposed. For the samples included in each ECW, it is calculated as:

$$r_{ECW} = \frac{\sum_{\forall n \in ECW}(s[n]-\overline{s'})(x[n]-\overline{x'})}{\sigma_{s'}\sigma_{x'}}$$

where $\overline{s'}$, $\overline{x'}$ and represent respectively the mean and the standard deviation, of s[n], 506, and x[n], 510, considering only the samples in ECW, 504.

The values of $r_{ECW} \in [-1,1]$. An $r_{ECW}$ absolute value, $|r_{ECW}|$, close to 1 indicates high correlation between the event and the cellular metric. $|r_{ECW}|$ values close to 0 indicate little or no relation between the event and the cellular metric. The sign of r indicates if the event is associated to an increase in x[n] (if $r_{ECW}>0$) or a decreased (if $r_{ECW}<0$). For example, the s[n] associated to a crowded event would most likely be associated to a positive correlation ($r_{ECW}>0$) in the number of users of a cell and a negative correlation, this means, a reduction in the quality metrics of a close cell.

In order to calculate the level of correlation of a venue having multiple events (and therefore multiple ECWs), the median of the $r_{ECW}$ values obtained for each of the multiple ECWs, 504, is implemented as a baseline system. Other options are also directly applicable, such as different statistics of the correlation results for the different events.

In this way, the obtained assessment of the correlation, 511, between the different cell-metrics and social elements is one of the most valuable information for the further application of the social data for the network management, e.g. for troubleshooting and planning purposes.

The results are suitably added in the existing list, 512, and provided as an output, 265, containing associated network and event data.

The next step of providing the output is handled by the outputs production module, 205, hereinafter referred to as an output module. The results obtained after any stage, 202, 203, 204, can be used to generate outputs of the system, 205. This flexibility is provided as partial results might be enough in some situations. For example, different Operation, Administration and Management, OAM, tasks or OAM engineers might only require the events/venues information without all their association with cellular data.

The outputs typically include the events/venues processed information consisting in the ranked list of events/venues with their different fields acquired/calculated during the process (name, start time, end time, venue, address, latitude, longitude, closest network sites, correlated cells, etc.). Depending on the stage where the outputs are created or the stages active in the different blocks during the system execution, the list could contain fewer or more fields. For example, if the outputs are generated at the end of the filtering module, 203, it would contain only social information and not cellular associated one, as the geographical close sites or the correlated cells.

It can also include specific reports with social and cellular associated data, such as the venues that most highly impact a cell, the level of correlation between network metrics and specific events, etc.

These different outputs can be in the form of data files (e.g. comma separated values, CSV), geographical files (e.g. Keyhole Markup Language, KML, Shapefile shape format, SHP), database storage, etc. The procedures to generate the outputs, the stages when they will be produced and the particularities of each execution can be pre-configured in the system in the outputs parameters & procedures element or introduced as an execution configuration input, 209.

Figure 7:
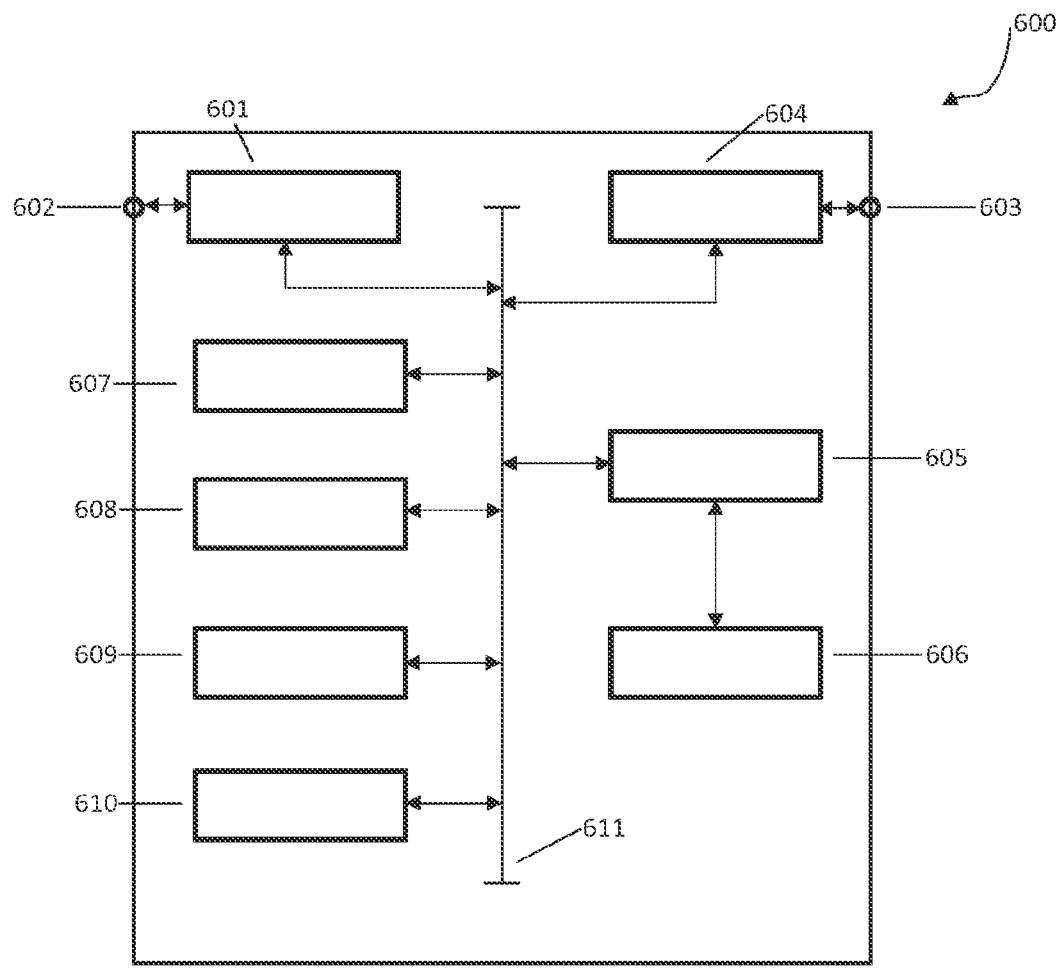
FIG. 7 is a schematic chart illustrating an example of a network element.

FIG. 7 is a schematic diagram illustrating an example, 600, of a network element, for example a node, which is capable of predicting an increase in amount of traffic in a particular cell of a telecommunication network when a method according to one of the examples as mentioned earlier is implemented in it.

The example, 600, comprises receive equipment 601, 602, arranged for receiving event information from at least one source which is external to said telecommunication network.

Further, process equipment 605 is provided, arranged for determining, based on said received traffic measurement data at least one UE among said second plurality of UE's in said second cell for performing said radio operation task, and perform equipment 706 is provided arranged for performing, by said second network node, said radio operation task involving said determined at least one UE.

The example, 600, comprises a processor, 605 and a memory, 606. The example further comprises of an Information acquisition module, 607, a filtering and ranking module, 608, a cellular network association module, 609 and an output module, 610. All these modules, 607-610, interact with one another and with the processor via a communication bus, 611. The modules 607-610 are correspondingly similar to the modules 202-205. Transmit equipment 603 and 604 are also provided within the example in order to facilitate communication with external devices such as User Equipment, UE, or other network elements.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for predicting an increase in amount of traffic in a particular cell of a telecommunication network, wherein said telecommunication network comprises a plurality of existing access nodes, wherein each of said existing access nodes is arranged to serve an existing cell in said telecommunication network, wherein each existing cell covers a predefined coverage area, said method comprising the steps of:
  receiving event information from at least one source which is external to said telecommunication network, being a social networking website or an event database, wherein said event information comprises geographic data and temporal data of events that are to take place;
  associating said events with at least one particular existing access node of said plurality of existing access nodes, based on said geographic data of each of said events and based on said predefined coverage areas of said existing cells;
  predicting an increase in amount of traffic in an existing cell of said telecommunication network based on said associated events with at least one particular existing access node and their corresponding temporal data; and
  adjusting operations, administration and management (OAM) processes for said at least one particular existing access node, based on said predicted increase in amount of traffic in said corresponding existing cell.

2. The method according to claim 1, wherein said method comprises a further step of requesting said event information from said external source.

3. The method according to claim 1, further comprising a step of formatting said received information into a predefined uniform data structure.

4. The method according to claim 1, wherein said method further comprises a step of combining multiple same events into a single aggregated event, wherein the multiple same events are defined as events having substantially the same geographic data and substantially the same temporal data.

5. The method according to claim 1, wherein said method further comprises the step of filtering and prioritizing said event information, wherein filtering of event information is based on availability of data or a type of venue and prioritizing of said event information is based on a number of people expected to attend said event or popularity of said event.

6. The method according to claim 1, wherein said association is based on geographical proximity, such that at least one existing cell of said telecommunication network closest to the geographical location of the event is associated to said event.

7. The method according to claim 1, wherein said OAM processes comprises at least one of failure management, preventive allocation of resources, re-planning, energy saving, and performing load balancing techniques.

8. A node configured for use in a telecommunication network and arranged for predicting an increase in the amount of traffic in a particular cell of said telecommunication network, wherein said telecommunication network comprises a plurality of existing access nodes, wherein each of said existing access nodes is arranged to serve existing cell in said telecommunication network, wherein each existing cell covers a predefined coverage area, said node comprising a processor and a computer readable storage medium comprising instructions executable by the processor, the executable instructions including:
  an information acquisition module configured to receive event information from at least one external source, being a social networking website or an event database, wherein said event information comprises geographic data and temporal data of events that are to take place;
  a cellular network association module configured to associate said received events with at least one particular existing access node of said plurality of existing access nodes, based on said geographic data of each of said events and based on said predefined coverage areas of said existing cells;
  an output module configured to predict an increase in amount of traffic in an existing cell of said telecommunication network, based on said associated events with at least one particular existing access node and their corresponding temporal data; and
  wherein said output module is further arranged for adjusting operations, administration and management (OAM) processes for said at least one particular existing access node, based on said predicted increase in amount of traffic in said corresponding existing cell.

9. The node according to claim 8, wherein said information acquisition module is further configured to request said event information from the at least one external source.

10. The node according to claim 8, wherein said information acquisition module is further configured to format the received information into a predefined uniform data structure.

11. The node according to claim 8, wherein said information acquisition module is further configured to combine multiple same events into a single aggregated event, wherein the multiple same events are defined as events having substantially the same geographic data and substantially the same temporal data.

12. The node according to claim 8, wherein said node further comprises a social filtering and ranking module configured to filter and prioritize said event information, wherein filtering of event information is based on availability of data or a type of venue and prioritizing of said event information is based on a number of people expected to attend said event or popularity of said event.

13. The node according to claim 8, wherein said association is based on geographical proximity such that at least one existing access node closest to the geographical location of the event is associated to said event.

14. The node according to claim 8, wherein said OAM processes comprises at least one of failure management, preventive allocation of resources, re-planning, energy saving, and optimization.

15. The node according to claim 8, wherein said node is located within an existing access node of said telecommunication network or located centrally in a server.

16. A node configured for use in a telecommunication network and comprising:
   a computer processor; and
   non-transitory storage medium storing program instructions that, when executed by the computer processor, configure the node to:
      receive information about an upcoming social gathering, the information indicating an event location and an event time;
      identify one or more existing cells of the telecommunication network that are associated with providing service in the event location, wherein the one or more existing cells have respective predefined coverage areas and are served by respective existing access nodes of the telecommunication network; and
      temporarily adjust one or more operating parameters for the identified one or more existing cells in conjunction with the occurrence of the event, as known from the event time, to account for an expected increase in user traffic in the identified existing cells.

* * * * *